United States Patent [19]

Yonezawa et al.

[11] Patent Number: 5,273,776
[45] Date of Patent: Dec. 28, 1993

[54] METHOD FOR FORMING THERMISTOR THIN FILM

[75] Inventors: Tadashi Yonezawa; Seiji Yamanaka; Takeshi Soe, all of Saitama, Japan

[73] Assignee: Mitsubishi Materials Corporation, Tokyo, Japan

[21] Appl. No.: 984,216

[22] Filed: Nov. 30, 1992

[30] Foreign Application Priority Data

| Dec. 6, 1991 | [JP] | Japan | 3-349139 |
| Jan. 6, 1992 | [JP] | Japan | 4-18313 |
| Feb. 27, 1992 | [JP] | Japan | 4-76352 |
| Feb. 27, 1992 | [JP] | Japan | 4-76353 |
| Feb. 27, 1992 | [JP] | Japan | 4-76354 |
| Mar. 23, 1992 | [JP] | Japan | 4-95937 |
| Aug. 26, 1992 | [JP] | Japan | 4-250746 |
| Sep. 28, 1992 | [JP] | Japan | 4-282434 |
| Sep. 28, 1992 | [JP] | Japan | 4-282435 |
| Sep. 28, 1992 | [JP] | Japan | 4-282436 |

[51] Int. Cl.$^5$ .............................................. B05D 5/12
[52] U.S. Cl. .................. 427/101; 427/126.3; 427/126.6; 427/240; 427/376.2; 427/443.2
[58] Field of Search ............ 427/101, 126.6, 130, 427/376.2, 126.3, 443.2

[56] References Cited

U.S. PATENT DOCUMENTS

| 2,596,284 | 5/1952 | Peters | 427/443.2 |
| 3,061,476 | 4/1958 | Miserocchi | 427/126.3 |
| 3,364,565 | 1/1968 | Sapoff et al. | 427/376.2 |
| 4,066,564 | 1/1978 | Sasazawa et al. | 427/130 |
| 4,369,105 | 1/1983 | Caldwell et al. | 427/126.6 |
| 4,837,046 | 6/1989 | Oishi et al. | 427/240 |

*Primary Examiner*—Shrive Beck
*Assistant Examiner*—Benjamin L. Utech
*Attorney, Agent, or Firm*—McAulay, Fisher, Nissen, Goldberg & Kiel

[57] ABSTRACT

A thermistor film is prepared by first preparing an alcohol solution is prepared by dissolving a metal compound in one or more kinds of polyvalent alcohols selected from the group consisting of ethylene glycol, diethylene glycol and glycerin. A coating solution is then prepared by adding and mixing an organic acid having a carboxyl group to the alcohol solution. The coating solution is coated on the surface of a heat-resistant substrate to form a coating film, the substrate on which the coating film is formed is dried and subjected to heat treatment to form a composite oxide precursor containing a metal of the above metal compound, and the precursor is calcined at a temperature of 600° to 1000° C. The method of the present invention can form a thermistor thin film which is dense and uniform over a wide range by simple and easy operations at a low cost.

14 Claims, No Drawings

METHOD FOR FORMING THERMISTOR THIN FILM

BACKGROUND OF THE INVENTION

This invention relates to a method for forming a thermistor thin film. More specifically, it relates to a thermistor thin film suitable for a heat sensitive resistor film for an NTC thermistor.

Heretofore, a manganese-cobalt oxide thin film has been used for this purpose. Such a film has been formed by a dry method on the surface of a substrate, by sputtering using a composite oxide containing manganese and cobalt as a target material (National Technical Report, Vol. 29, No. 3, 1983). In a wet method, a methanol solution of a $\beta$-diketonato complex containing three components of Mn-Co-Ni is coated on a glass or quartz substrate by dipping, and after calcinating at 450° C., the coating and calcination are repeated to form a Mn-Co-Ni thin film (Masaharu Kaneko et al., 4th Japan Ceramic Association, Autumn Symposium, Preprint (1991), p. 140).

However, with the physical deposition method the sputtering method, it is difficult to obtain a dense and uniform manganese-cobalt oxide thin film over a wide range and the preparation cost becomes expensive.

In the wet method, when dissolving the $\beta$-diketonato complex in the methanol solution, the precipitation rates of the respective components may not be uniform. It is also inconvenient in that the thin film composition may vary from the desired composition due to the difference in volatilities of the respective components at calcination.

SUMMARY OF THE INVENTION

An object of the present invention is to provide a method for forming a thermistor thin film which is dense and uniform over a wide range in a simple, facile manner and at low cost. This is achieved by the inventive method which comprises preparing an alcohol solution by dissolving a metal compound in a polyvalent alcohol selected from the group consisting of ethylene glycol, diethylene glycol, glycerin and mixtures thereof; preparing a coating solution by mixing an organic acid having a carboxyl group with the alcohol solution; forming a coating film of the coating solution on the surface of a heat-resistant substrate; forming a composite oxide precursor containing the above metal by drying and heating the coated substrate; and calcinating the composite oxide precursor at a temperature of 600° to 1000° C.

DETAILED DESCRIPTION OF THE INVENTION

In a first specific aspect of the present invention, the metal compound may be a manganese compound selected from the group consisting of manganese nitrate, manganese acetate, manganese carbonate, manganese chloride, and mixtures thereof, and a cobalt compound selected from the group consisting of cobalt nitrate, cobalt acetate, cobalt carbonate, cobalt chloride, and mixtures thereof. The organic acid having a carboxyl group may be a carboxylic acid selected from the group consisting of formic acid, acetic acid, propionic acid, butyric acid, and mixtures thereof.

In a second specific aspect of the present invention, the metal compound may be a manganese compound selected from the group consisting of manganese nitrate, manganese acetate, manganese carbonate, halide of manganese, and mixtures thereof, and a cobalt compound selected from the group consisting of cobalt nitrate, cobalt acetate, cobalt carbonate, halide of cobalt, and mixtures thereof. The organic acid having a carboxyl group may be an oxyacid selected from the group consisting of glycolic acid, lactic acid, hydroacrylic acid, glyceric acid, malic acid, tartaric acid, citric acid, salicylic acid, and mixtures thereof. In a third specific aspect of the present invention, the metal compound may be a manganese compound selected from the group consisting of manganese nitrate, manganese acetate, manganese carbonate, manganese chloride, and mixtures thereof, and a cobalt compound selected from the group consisting of cobalt nitrate, cobalt acetate, cobalt carbonate, cobalt chloride and mixtures thereof. The organic acid having a carboxyl group may be an amino acid selected from the group consisting of glycine, alanine, serine, and mixtures thereof.

In a fourth specific aspect of the present invention, the metal compound may be a manganese compound selected from the group consisting of manganese nitrate, manganese acetate, manganese carbonate, manganese chloride, and mixtures thereof, and a cobalt compound selected from the group consisting of cobalt nitrate, cobalt acetate, cobalt carbonate, cobalt chloride, and mixtures thereof. The organic acid having a carboxyl group may be a dicarboxylic acid selected from the group consisting of oxalic acid, malonic acid, succinic acid, glutaric acid, adipic acid, and mixtures thereof.

In a fifth specific aspect of the present invention, the metal compound may be a manganese compound selected from the group consisting of manganese nitrate, manganese acetate, manganese carbonate, manganese chloride, and mixtures thereof, and a cobalt compound selected from the group consisting of cobalt nitrate, cobalt acetate, cobalt carbonate, cobalt chloride, and mixtures thereof. The organic acid having a carboxyl group may be a olefin carboxylic acid selected from the group consisting of acrylic acid, crotonic acid, vinylacetic acid, methacrylic acid, angelic acid, tiglic acid, allylacetic acid, 3-methylcrotonic acid, maleic acid, fumaric acid, and mixtures thereof.

In a sixth specific aspect of the present invention, the metal compound may be a manganese compound selected from the group consisting of manganese nitrate, manganese acetate, manganese carbonate, manganese chloride, and mixtures thereof, and a cobalt compound selected from the group consisting of cobalt nitrate, cobalt acetate, cobalt carbonate and cobalt chloride, and mixtures thereof. The organic acid having a carboxyl group may be an aromatic carboxylic acid selected from the group consisting of benzoic acid, phthalic acid, salicylic acid, hydroxybenzoic acid, gallic acid, mandelic acid, tropic acid, aminobenzoic acid, and mixtures thereof.

In a seventh specific aspect of the present invention, the metal compound may be a manganese compound selected from the group consisting of manganese nitrate, manganese acetate, manganese carbonate, manganese chloride, and mixtures thereof, and a cobalt compound selected from the group consisting of cobalt nitrate, cobalt acetate, cobalt carbonate, cobalt chloride, and mixtures thereof, and a copper compound selected from the group consisting of copper nitrate, copper acetate, copper carbonate, copper chloride, and mixtures thereof. The organic acid having a carboxyl group may be an organic acid selected from the group consisting of a hydroxy acid, an amino acid, a dicarboxylic acid, an olefin carboxylic acid, aromatic carboxylic acid, and mixtures thereof.

In an eighth specific aspect of the present invention, the metal compound, may be a manganese compound selected from the group consisting of manganese nitrate, manganese acetate, manganese carbonate, manganese chloride, and mixtures thereof, and a cobalt compound selected from the group consisting of cobalt nitrate, cobalt acetate, cobalt carbonate, cobalt chloride, and mixtures thereof, an iron or aluminum compound selected from the group consisting of iron nitrate, iron acetate, iron carbonate, iron chloride aluminum nitrate, aluminum acetate, aluminum carbonate, aluminum chloride, and mixtures thereof. The organic acid having a carboxyl group may be an organic acid selected from the group consisting of an hydroxy acid, an amino acid, a dicarboxylic acid, an olefin carboxylic acid, aromatic carboxylic acid, and mixtures thereof.

In a ninth specific aspect of the present invention, the metal compound, may be a manganese compound selected from the group consisting of manganese nitrate, manganese acetate, manganese carbonate, manganese chloride, and mixtures thereof, and a nickel compound selected from the group consisting of nickel nitrate, nickel acetate, nickel carbonate, nickel chloride, and mixtures thereof, and, in addition thereto, a cobalt, copper, aluminum or iron compound selected from the group consisting of cobalt nitrate, cobalt acetate, cobalt carbonate, cobalt chloride, copper nitrate, copper acetate, copper carbonate, copper chloride, aluminum nitrate, aluminum acetate, aluminum carbonate, aluminum chloride, iron nitrate, iron acetate, iron carbonate, iron chloride, and mixtures thereof. The organic acid having a carboxyl group may be an organic acid selected from the group consisting of an hydroxy acid, an amino acid, a dicarboxylic acid, an olefin carboxylic acid, aromatic carboxylic acid, and mixtures thereof.

In a tenth specific aspect of the present invention, the metal compound may be an aluminum compound, a chromium compound, an iron compound or a nickel compound, selected from the group consisting of aluminum nitrate, aluminum acetate, aluminum carbonate, aluminum chloride, chromium nitrate, chromium acetate, chromium carbonate, chromium chloride, iron nitrate, iron acetate, iron carbonate, iron chloride, nickel nitrate, nickel acetate, nickel carbonate, nickel chloride, and mixtures thereof, and further includes a magnesium compound selected from the group consisting of magnesium nitrate, magnesium acetate, magnesium carbonate, magnesium chloride, and mixtures thereof. The organic acid having a carboxyl group may be an organic acid selected from the group consisting of an hydroxy acid, an amino acid, a dicarboxylic acid, an olefin carboxylic acid, an aromatic carboxylic acid, and mixtures thereof.

In carrying out the present invention, the above metal compounds are dissolved the polyvalent alcohol. The concentration of the alcohol solution depends on the thickness of the thin film, but preferably is from 0.02 to 1.00 mole/l. If it is less than 0.02 mole/l, it is difficult to form a film since the solution is too thin and if it exceeds 1.00 mole/l, the metal compound may not be completely soluble or a or crack may form after film formation. The polyvalent alcohol functions not only as a solvent, but also, as a stabilizer for the alcohol solution by coordinating to a metal element which is a constitutional element of the metal compound.

Then, the organic acid is added to and mixed with the polyvalent alcohol solution to prepare a coating solution. At this time, the carboxyl group reacts with the polyvalent alcohol to form an ester, thereby imparting a film forming property to the coating solution. When the organic acid is an hydroxy acid, an amino acid, an olefin carboxylic acid or an aromatic carboxylic acid, the hydroxyl group, amino group, olefin chain or benzene ring, which are respective constitutional components of these organic acids, coordinates with the metal element of the metal compound to increase the film forming property of the coating solution. The molar ratio of the organic acid to the metal compound is desirably in the range of 0.2 to 5.0. If it is less than 0.2, the film forming property is insufficient, while if it exceeds 5.0, redissolution of a coated film occurs which may cause the coated film surface to be rough.

A lower alcohol selected from the group consisting of methanol, ethanol, propanol, butanol, and mixtures thereof, may be also be admixed with the coating solution. This serves to improve the wetting property of the solution. These lower alcohols may be added in an amount of from 0 to 50% by weight.

The coating solution is coated onto the surface of a substrate having heat resistance. The substrate may be any which can endure the ensuing calcination temperature, and it may be made of a metal, such as, gold, silver, platinum, etc., an alloy containing at least one kind of the above metal as a main component, ceramics, such as, glass, carbon, silicon, silica, alumina, magnesia, zirconia, titania, strontium titanate, boron nitride, silicon nitride, boron carbide, silicon carbide, etc. and the like. The shape of the substrate may be any shape, e.g., fibrous, a film, a plate, bulk, etc. Before coating, it is desirable to make the surface of the substrate smooth by polishing, and further to remove any oil components, and the like, by washing.

The coating method may be a screen printing method, a spray coating method in which the coating solution is sprayed onto the substrate, a dip coating method in which the substrate is dipped into the coating solution and then taken out. Preferred is a spin coating method in which the costing solution is dropped or applied onto the substrate and the substrate is spun to create a uniform, thin film.

The coating film formed on the surface of the substrate is dried at a temperature of from room temperature to 200° C. The dried coating film is then subjected to a heat treatment at 300° to 500° C. in order to remove organic components. As a result, a complex oxide precursor containing the metal of the metal compound is formed. When this precursor is calcined under atmospheric pressure or an oxygen atmosphere at 600° to 1000° C., a thermistor thin film is formed on the substrate.

By repeating the procedure from the formation of the coating film and the heat treatment as mentioned above, the film thickness can be increased, and by controlling the number of repetitions, a thermistor thin film having the desired thickness can be obtained.

By effecting the formation of the coating film and the heat treatment in a single cycle, i.e., without repetition, a thin film with a sub-micron thickness can be formed after calcination. However, the thickness of the thin film may vary depending on the concentration of the above alcohol solution, the viscosity of the coating solution, a draw up rate of the substrate, the amount spraying, and the like. In addition, by increasing the number repetition of the steps, a thin film of several microns thickness can be obtained.

In the present invention, the coating solution is stabilized by dissolving the metal compound in the polyvalent alcohol and further adding the organic acid having a carboxyl group, to develop a film forming property in the coating solution. When the coating solution is coated on the substrate and dried, the solute forms a coating film with a sub-micron or less thickness on the substrate so that a uniform and extremely thin coating film can be obtained. A thermistor having a thickness from sub-micron to several microns can be obtained on the surface of the substrate by controlling the solution conditions, coating conditions, or number of laminating cycles, i.e., repetitions.

In contrast to the conventional method wherein a dense and uniform film over a wide range cannot be formed, and the processes are relatively expensive, with the present invention, the metal compound can be dissolved in a solution by chemical means, and the solution subjected to heat treatment to eliminate the organic component and form a thin film. Thus, the present invention provides an efficacious method to produce a dense thin film, uniform over a wide range with a thickness of 1 $\mu$m or less by using a simple and easy technique.

When the complex oxide thin film obtained by the present invention provides a heat sensitive resistor film for a thermistor having negative resistance temperature characteristics, increased heat sensitive response and improve surface mounting properties for mounting the thermistor on a substrate.

The following Examples illustrates the invention:

EXAMPLE 1

In 100 ml of ethylene glycol were dissolved 2.0 g of manganese nitrate hexahydrate and 4.07 g of cobalt nitrate hexahydrate. To the solution was added 0.88 g of isobutyric acid and the mixture was stirred. To the solution was further added 100 ml of isopropyl alcohol and the mixture was uniformly mixed. This mixed solution was coated onto the surface of an alumina substrate by the dipping method. That is, the alumina substrate was dipped into the standing coating solution and then drawn vertically out of the solution at a rate of 24 mm/sec.

The coating film formed on the substrate surface was dried by heating the substrate at a temperature of 120° C. and the substrate was then subjected to a heat treatment at 500° C. to remove the organic components of the coating film.

The above coating, drying and heat treatment steps were repeated six times. Thereafter, the substrate was calcined under atmospheric pressure at 800° C. for 2 hours. A thin film of manganese cobalt oxides ($MnCo_2O_4$) with a submicron thickness was obtained on the surface of the substrate.

EXAMPLE 2

The procedure of Example 1 was repeated except for the following:

2.68 g of malic acid was use in place of the isobutyric acid.

After calcining, a thin film of manganese cobalt oxides ($MnCo_2O_4$) with a submicron thickness was obtained on the surface of the substrate.

EXAMPLE 3

In 100 ml of ethylene glycol were dissolved 2.0 g of manganese nitrate hexahydrate and 4.07 g of cobalt nitrate hexahydrate. 1.50 g of glycine was admixed with this solution and then 100 ml of isopropyl alcohol was added and the mixture was uniformly mixed. This mixed solution was coated onto the surface of an alumina substrate by the dipping method. That is, the alumina substrate was dipped into the standing coating solution and then drawn vertically out of the solution at a rate of 24 mm/sec.

The coating film formed on the substrate surface was dried by heating the substrate at a temperature of 120° C. and the substrate was then subjected to a heat treatment at 500° C. to remove the organic components of the coating film.

The above coating, drying and heat treatment steps were repeated six times. Thereafter, the substrate was calcined under atmospheric pressure at 800° C. for 2 hours. A thin film of manganese cobalt oxides ($MnCo_2O_4$) with a submicron thickness was obtained on the surface of the substrate.

EXAMPLE 4

The procedure of Example 1 was repeated except for the following:

2.08 g of malic acid was use in place of the isobutyric acid.

After calcining, a thin film of manganese cobalt oxides ($MnCo_2O_4$) with a submicron thickness was obtained on the surface of the substrate.

EXAMPLE 5

The procedure of Example 1 was repeated except for the following:

1.44 g of acrylic acid was use in place of the isobutyric acid.

After calcining, a thin film of manganese cobalt oxides ($MnCo_2O_4$) with a submicron thickness was obtained on the surface of the substrate.

EXAMPLE 6

Substantially the same procedure as in Example 5 was repeated except for using 1.96 g of maleic acid in place of 1.44 g of acrylic acid. After calcining, a thin film of manganese cobalt oxides ($MnCo_2O_4$) with a submicron thickness was obtained on the surface of the substrate.

EXAMPLE 7

Substantially the same procedure as in Example 5 was repeated except for using 2.76 g of salicylic acid in place of 1.44 g of acrylic acid and except for using a drying temperature of 150° C. in place of 120° C. After calcining, a thin film of manganese cobalt oxides ($MnCo_2O_4$) with a submicron thickness was obtained on the surface of the substrate.

EXAMPLE 8

Substantially the same procedure as in Example 7 was repeated except for using 3.32 g of phthalic acid in place of 2.76 g of salicylic acid. After calcining, a thin film of manganese cobalt oxides ($MnCo_2O_4$) with a submicron thickness was obtained on the surface of the substrate.

EXAMPLE 9

In 62.07 g of ethylene glycol were dissolved 14.90 g of manganese nitrate hexahydrate, 7.62 g of cobalt nitrate hexahydrate and 5.29 g of copper nitrate trihydrate. To the solution were added 26.82 g of malic acid and the mixture was stirred to form a coating solution. This coating solution was applied onto the surface of an alumina substrate by the spin coating method. That is, after dropping the coating solution on the surface of the alumina substrate, the substrate was rotated at 2000 rpm.

The coating film formed on the substrate surface was dried by heating the substrate at a temperature of 120° C. The substrate was then subjected to heat treatment at 500° C. to remove the organic components of the coating film.

After repeating the above coating, drying and heat treatment steps six times, the substrate was further calcined under atmospheric pressure at 600° C. for 6 hours. A thin film of manganese cobalt copper oxides with a submicron thickness was obtained on the surface of the substrate.

EXAMPLE 10

The procedure of Example 9 was repeated except that in place of the malic acid, 7.51 g of glycine was used and the substrate was rotated at 3000 rpm instead of 2000 rpm. After calcining, a thin film of manganese cobalt copper oxides with a submicron thickness was obtained on the surface of the substrate.

EXAMPLE 11

The procedure of Example 9 was repeated except that in place of the copper nitrate trihydrate, 8.85 g of iron nitrate nonahydrate were used. After calcining, a thin film of manganese cobalt iron oxides with a submicron thickness was obtained on the surface of the substrate.

EXAMPLE 12

Substantially the same procedure as in Example 11 was repeated except for using 8.22 g of aluminum nitrate nonahydrate in place of the 8.85 g of iron nitrate hexahydrate. As a result, a thin film of manganese cobalt aluminum oxides with a thickness of submicron was obtained on the surface of the substrate.

EXAMPLE 13

Substantially the same procedure as in Example 11 was repeated except for using 7.51 g of glycine in place of the malic acid and rotating the substrate at 3000 rpm instead of 2000 rpm. After calcining, a thin film of manganese cobalt iron oxides with a submicron thickness was obtained on the surface of the substrate.

EXAMPLE 14

Substantially the same procedure as in Example 13 was repeated except for using 8.22 g of aluminum nitrate nonahydrate in place of 8.85 g of iron nitrate nonahydrate. As the result, a thin film of manganese cobalt aluminum oxides with a submicron thickness was obtained on the surface of the substrate.

EXAMPLE 15

In 62.07 g of ethylene glycol were dissolved 22.96 g of manganese nitrate hexahydrate, 5.09 g of nickel nitrate hexahydrate and 0.73 g of cobalt nitrate hexahydrate. To the solution were added 26.82 g of malic acid and the mixture was stirred to form a coating solution. The remainder of the procedure was as in Example 11. As the result, a thin film of manganese nickel cobalt oxides with a submicron thickness was obtained on the surface of the substrate.

EXAMPLE 16

Substantially the same procedure as in Example 15 was repeated except for using 0.60 g of copper nitrate trihydrate in place of 0.73 g of cobalt nitrate hexahydrate. As the result, a thin film of manganese nickel copper oxides with a submicron thickness was obtained on the surface of the substrate.

EXAMPLE 17

Substantially the same procedure as in Example 15 was repeated except for using 0.94 g of aluminum nitrate nonahydrate in place of 0.73 g of cobalt nitrate hexahydrate. As the result, a thin film of manganese nickel aluminum oxides with a submicron thickness was obtained on the surface of the substrate.

EXAMPLE 18

Substantially the same procedure as in Example 15 was repeated except for using 1.01 g of iron nitrate nonahydrate in place of 0.73 g of cobalt nitrate hexahydrate. As the result, a thin film of manganese nickel iron oxides with a submicron thickness was obtained on the surface of the substrate.

EXAMPLE 19

Substantially the same procedure as in Example 15 was used except that the metal compounds used were 9.48 g of aluminum nitrate nonahydrate, 9.61 g of chromium nitrate nonahydrate, 7.02 g of iron nitrate nonahydrate and 8.55 g of magnesium nitrate hexahydrate and the substrate was heat treated at 400° C. instead of 500° C. and further calcined at 700° C. instead of 600° C. As a result, a thin film of Al-Cr-Fe-Mg-O with a submicron thickness was obtained on the surface of the substrate.

EXAMPLE 20

Substantially the same procedure as in Example 13 was used except that the metal compounds used were 7.62 g of aluminum nitrate hexahydrate, 5.29 g of chromium nitrate nonahydrate, 5.29 g of iron nitrate nonahydrate and 14.90 g of magnesium nitrate hexahydrate. A thin film of Al-Cr-Fe-Mg-O with a submicron thickness was obtained on the surface of the substrate.

What is claimed is:

1. A method for forming a thermistor film comprising the steps of:
   a) preparing an alcohol solution by dissolving at least two metal compounds in a polyvalent alcohol selected from the group consisting of ethylene glycol, diethylene glycol, glycerin, and mixtures thereof;
   b) preparing a coating solution by admixing an organic acid having a carboxyl group with the alcohol solution;
   c) forming a coating film on a heat-resistant substrate by applying the coating solution onto the surface of the substrate;
   d) forming a composite oxide precursor containing the metal of the metal compounds by drying and heating the coated substrate; and
   e) and calcining the composite oxide precursor at a temperature of from 600° to 1000° C.

2. The method of claim 1, wherein an alcohol selected from the group consisting of methanol, ethanol, propanol, butanol, and mixtures thereof is added to the coating solution.

3. The method of claim 1 wherein the coating solution is coated on the substrate surface by dipping or a spin coating method.

4. The method of claim 1 wherein the metal compounds include a manganese compound selected from the group consisting of manganese nitrate, manganese acetate, manganese carbonate, manganese chloride, and mixtures thereof, and a cobalt compound selected from the group consisting of cobalt nitrate, cobalt acetate, cobalt carbonate, cobalt chloride, and mixtures thereof, and the organic acid having a carboxyl group is a carboxylic acid selected from the group consisting of formic acid, acetic acid, propionic acid, butyric acid, and mixtures thereof.

5. The method of claim 1 wherein the metal compounds include a manganese compound selected from the group consisting of nitrates, acetates, carbonates, and halides of manganese, and mixtures thereof, and a cobalt compound selected from the group consisting of nitrates, acetates, carbonates, and halides of cobalt, and mixtures thereof, and the organic acid having a carboxyl group is an oxyacid selected from the group consisting of glycolic acid, lactic acid, hydroacrylic acid, glyceric acid, malic acid, tartaric acid, citric acid, salicylic acid, and mixtures thereof.

6. The method of claim 5 wherein the nitrate of manganese is manganese nitrate, the acetate of manganese is manganese acetate, the carbonate of manganese is manganese carbonate, the halide of manganese is manganese chloride, the nitrate of cobalt is cobalt nitrate, the acetate of cobalt is cobalt acetate, the carbonate of cobalt is cobalt carbonate, and the halide of cobalt is cobalt chloride.

7. The method of claim 1 wherein the metal compounds include a manganese compound selected from the group consisting of manganese nitrate, manganese acetate, manganese carbonate, manganese chloride, and mixtures thereof, and a cobalt compound selected from the group consisting of cobalt nitrate, cobalt acetate, cobalt carbonate, cobalt chloride, and mixtures thereof, and the organic acid having a carboxyl group is an amino acid selected from the group consisting of glycine, alanine, serine, and mixtures thereof.

8. The method of claim 1 wherein the metal compounds include a manganese compound selected from the group consisting of manganese nitrate, manganese acetate, manganese carbonate, manganese chloride, and mixtures thereof, and a cobalt compound selected from the group consisting of cobalt nitrate, cobalt acetate, cobalt carbonate, cobalt chloride, and mixtures thereof, and organic acid having a carboxyl group is a dicarboxylic acid selected from the group consisting of oxalic acid, malonic acid, succinic acid, glutaric acid, adipic acid, and mixtures thereof.

9. The method of claim 1 wherein the metal compounds include a manganese compound selected from the group consisting of manganese nitrate, manganese acetate, manganese carbonate, manganese chloride, and mixtures thereof, and a cobalt compound selected from the group consisting of cobalt nitrate, cobalt acetate, cobalt carbonate, cobalt chloride, and mixtures thereof, and the organic acid having a carboxyl group is an olefin carboxylic acid selected from the group consisting of acrylic acid, crotonic acid, vinylacetic acid, methacrylic acid, angelic acid, tiglic acid, allylacetic acid, 3-methylcrotonic acid, maleic acid, fumaric acid, and mixtures thereof.

10. The method of claim 1 wherein the metal compounds include a manganese compound selected from the group consisting of manganese nitrate, manganese acetate, manganese carbonate, manganese chloride, and mixtures thereof, and a cobalt compound selected from the group consisting of cobalt nitrate, cobalt acetate, cobalt carbonate, cobalt chloride, and mixtures thereof, and the organic acid having a carboxyl group is an aromatic carboxylic acid selected from the group consisting of benzoic acid, phthalic acid, salicylic acid, hydroxybenzoic acid, gallic acid, mandelic acid, tropic acid, aminobenzoic acid, and mixtures thereof.

11. The method of claim 1 wherein the metal compounds include a manganese compound selected from the group consisting of manganese nitrate, manganese acetate, manganese carbonate, manganese chloride, and mixtures thereof, and a cobalt compound selected from the group consisting of cobalt nitrate, cobalt acetate, cobalt carbonate, cobalt chloride, and mixtures thereof, and a copper compound selected from the group consisting of copper nitrate, copper acetate, copper carbonate, copper chloride, and mixtures thereof, and the organic acid having a carboxyl group is an organic acid selected from the group consisting of a hydroxy acid, an amino acid, a dicarboxylic acid, an olefin carboxylic acid, an aromatic carboxylic acid, and mixtures thereof.

12. The method of claim 1 wherein the metal compounds include a manganese compound selected from the group consisting of manganese nitrate, manganese acetate, manganese carbonate, manganese chloride, and mixtures thereof a cobalt compound selected from the group consisting of cobalt nitrate, cobalt acetate, cobalt carbonate, cobalt chloride, and mixtures thereof, and iron or aluminum compound selected from the group consisting of iron nitrate, iron acetate, iron carbonate, iron chloride, aluminum nitrate, aluminum acetate, aluminum carbonate, aluminum chloride, and mixtures thereof, and the organic acid having a carboxyl group is an organic acid selected from the group consisting of a hydroxy acid, an amino acid, a dicarboxylic acid, an olefin carboxylic acid, aromatic carboxylic acid, and mixtures thereof.

13. The method of claim 1 wherein the metal compounds include a manganese compound selected from the group consisting of manganese nitrate, manganese acetate, manganese carbonate, manganese chloride, and mixtures thereof, a nickel compound selected from the group consisting of nickel nitrate, nickel acetate, nickel carbonate, nickel chloride, and mixtures thereof, and a cobalt, copper, or iron compound selected from the group consisting of cobalt nitrate, cobalt acetate, cobalt carbonate, cobalt chloride, copper nitrate, copper acetate, copper carbonate, copper chloride, aluminum nitrate, aluminum acetate, aluminum carbonate, aluminum chloride, iron nitrate, iron acetate, iron carbonate, iron chloride, and mixtures thereof, and the organic acid having a carboxyl group organic acids selected from the group consisting of a hydroxy acid, an amino acid, a dicarboxylic acid, an olefin carboxylic acid, aromatic carboxylic acid, and mixtures thereof.

14. The method of claim 1 wherein the metal compounds include is selected from the group consisting of aluminum nitrate, aluminum acetate, aluminum carbonate, aluminum chloride, chromium nitrate, chromium acetate, chromium carbonate, chromium chloride, iron nitrate, iron acetate, iron carbonate, iron chloride, nickel nitrate, nickel acetate, nickel carbonate, nickel chloride, and mixtures thereof, and further comprises magnesium compound selected from the group consisting of magnesium nitrate, magnesium acetate, magnesium carbonate, magnesium chloride, and mixtures thereof, and the organic acid having a carboxyl group is an organic acid selected from the group consisting of a hydroxy acid, an amino acid, a dicarboxylic acid, an olefin carboxylic acid, an aromatic carboxylic acid, and mixtures thereof.

* * * * *